(12) United States Patent
Voorhees (10) Patent No.: US 8,356,966 B2
(45) Date of Patent: Jan. 22, 2013

(54) MOBILE OIL FIELD RIG WITH AIR BEARING TRANSPORT

(76) Inventor: Ronald J. Voorhees, Houston, TX (US)

(*) Notice: Subject to any disclaimer, the term of this patent is extended or adjusted under 35 U.S.C. 154(b) by 593 days.

(21) Appl. No.: 12/636,824

(22) Filed: Dec. 14, 2009

(65) Prior Publication Data

US 2011/0142586 A1    Jun. 16, 2011

(51) Int. Cl.
*B65G 35/00* (2006.01)
(52) U.S. Cl. .................. 414/676; 180/116; 180/119
(58) Field of Classification Search .......... 180/116, 180/117, 118, 119, 120, 121; 405/232, 231, 405/303; 52/651.05, 651.01, 651.07, 110, 52/11, 116, 745.15; 212/294, 175
See application file for complete search history.

(56) References Cited

U.S. PATENT DOCUMENTS

| | | | | |
|---|---|---|---|---|
| 3,831,525 A | * | 8/1974 | Burdick et al. | 104/23.2 |
| 3,832,858 A | * | 9/1974 | Anders | 405/232 |
| 7,584,809 B1 | | 9/2009 | Flud | |

* cited by examiner

*Primary Examiner* — Tony H. Winner
*Assistant Examiner* — Jacob Knutson
(74) *Attorney, Agent, or Firm* — Office of Tim Cook PC (57) ABSTRACT

A rig transport system provides an air bearing subsystem supporting a drilling and workover rig. The transport system moves the entire rig without having to disassemble the rig, including leaving the derrick in a vertical standing position, along one of a pair of parallel tracks. The air bearing subsystem distributes the rig load over a large footprint to reduce ground bearing pressure. The air bearings lift the load so that the entire rig rides on a film of air, thereby reducing moving friction by up to about 96%.

3 Claims, 8 Drawing Sheets

MOBILE OIL FIELD RIG WITH AIR BEARING TRANSPORT

FIELD OF THE INVENTION

The present invention relates generally to the field of oil field drilling and workover rigs, and, more particularly, to a mobile rig that rides on air bearings for movement from one work location to another.

BACKGROUND OF THE INVENTION

Oil and gas rigs are used in the field for many purposes, including drilling, workover, and maintenance operations. Land-based drilling rigs generally consist of engines, a drawworks, a mast (or derrick), pumps to circulate the drilling fluid (mud) under various pressures, blowout preventers, drill string and related equipment. The engines power the different pieces of equipment, including a rotary table or top drive that turns the drill string, causing the drill bit to bore through the subsurface rock layers. Rock cuttings are carried to the surface by the circulating drilling fluid. The intended well depth, bore hole diameter and drilling site conditions are the principal factors that determine the size and type of rig most suitable for a particular drilling job. Land-based workover rigs (commonly referred to as well servicing rigs), on the other hand, consist of a mobile carrier, engine, drawworks and a mast. The primary function of a workover rig is to act as a hoist so that pipe, sucker rods and down-hole equipment can be run into and out of a well. Land-based workover rigs are easier to move between well sites and different geographical areas of operations than drilling rigs. Typically, the rigs are self-propelled and have less auxillary equipment to move. Because of size and cost considerations, workover rigs are used for these operations rather than the larger drilling rigs.

Typically, an oil and gas field will have many sites or boreholes at which drilling or maintenance operations are to take place. Thus, a rig may be positioned at one worksite, and then must be moved to another worksite. A typical method of moving a drilling or working rig from one worksite to another involves breaking down the rig, loading the rig onto a self-propelled or towed vehicle or trailer, then reassembling the rig at a new worksite. Known self-propelled or towed vehicles ride on wheels with rubber tires or tracks. Whichever type of support is used, this type of operation is labor intensive, time consuming, and often dangerous. All the time that is spent in such a move is lost production time.

Thus, there remains a need for a quick and efficient means of moving a rig from one site to another in an oil and gas field. The system disclosed herein is directed to filling this need in the art.

SUMMARY OF THE INVENTION

The rig transport system disclosed herein provides an air bearing subsystem supporting a drilling and workover rig. The moving system moves the entire rig without having to disassemble the rig, including leaving the derrick in a vertical standing position. The air bearing subsystem distributes the rig load over a large footprint to reduce ground bearing pressure. The air bearings lift the load so that the entire rig rides on a film of air, thereby reducing moving friction by up to about 96%.

The air bearings ride along a concrete guide track, to maintain a straight line movement or a side to side motion, depending on the layout of well sites.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
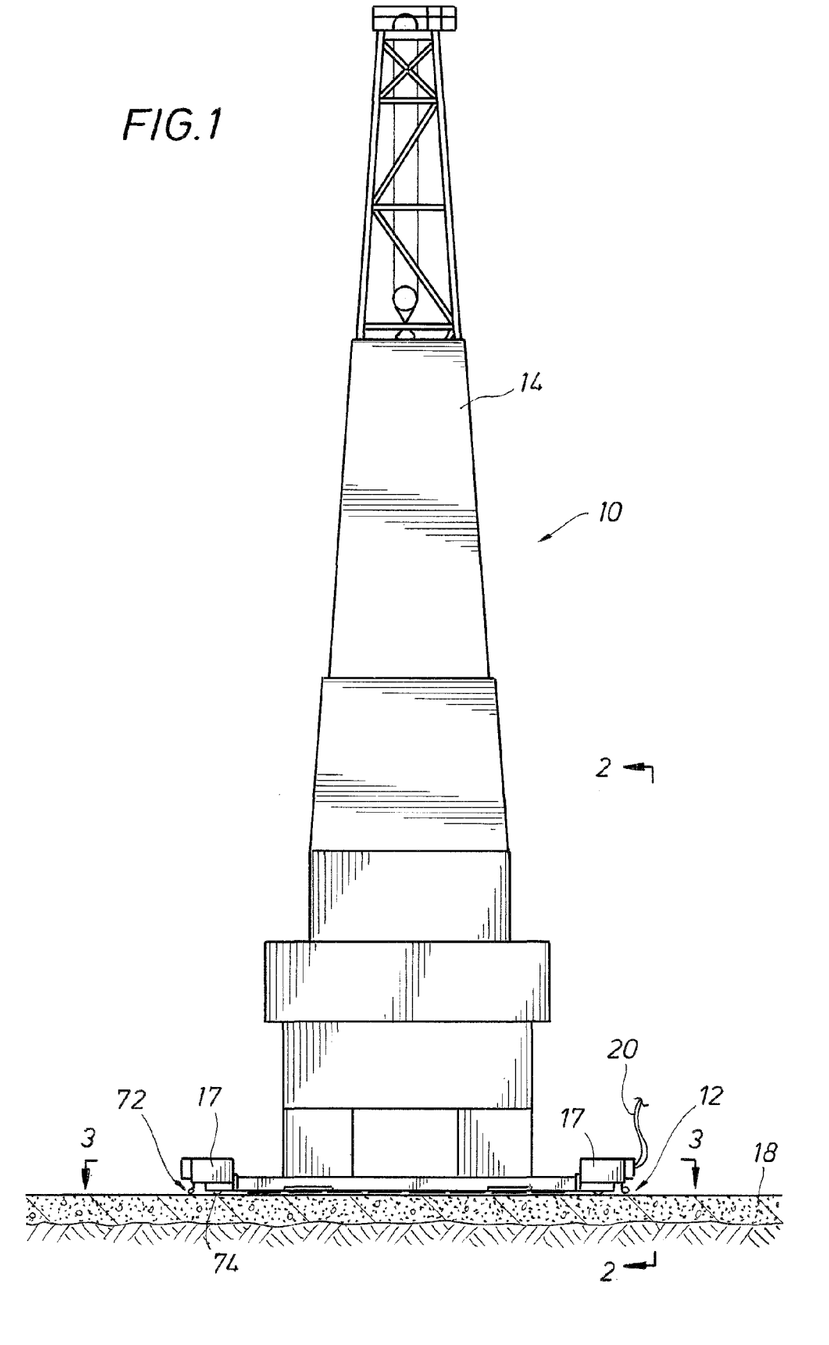
FIG. 1 is an elevation side view of a rig riding on an air bearing subsystem.

FIG. 1 depicts a field rig 10 supported for transport on an air bearing subsystem 12. As used herein, the term "rig" refers to either a drilling rig or a workover rig, since the air bearing transport shown and described herein is equally adaptable to either type of rig. During transport of the rig 10, a derrick structure 14 remains erect and intact so that the rig is ready for work as soon as it reaches a new site. In other systems known in the art, the entire derrick structure must be dismantled or lowered to a horizontal position in order to move the rig from one well to another.

Preferably, the system includes a set of self-propelled wheels 16 driven by a drive system 17, although other means of moving the rig may be used, in conjunction with the air bearing subsystem 12. The drive subsystem will be described below in greater detail in respect of FIGS. 7 and 8.

As shown in FIG. 1, the rig moves along a concrete track or pad 18, moving various auxiliary equipment along with the rig, depending on whether or not drilling or maintenance operations are to be carried out by the rig. The air bearing subsystem 12, on which the rig rides, comprises a plurality of air bearings, shown and described below in greater detail, and the air bearings are supplied with compressed air through an air supply 20. Preferably, the air supply 20 is coupled to an air compressor and air receiver (not shown) on a trailer coupled to the rig when rig movement is to be carried out. By using a separate trailer with the air supply system, these components do not take up space and footprint on the rig 10, leaving more room for other elements.

Figure 2:
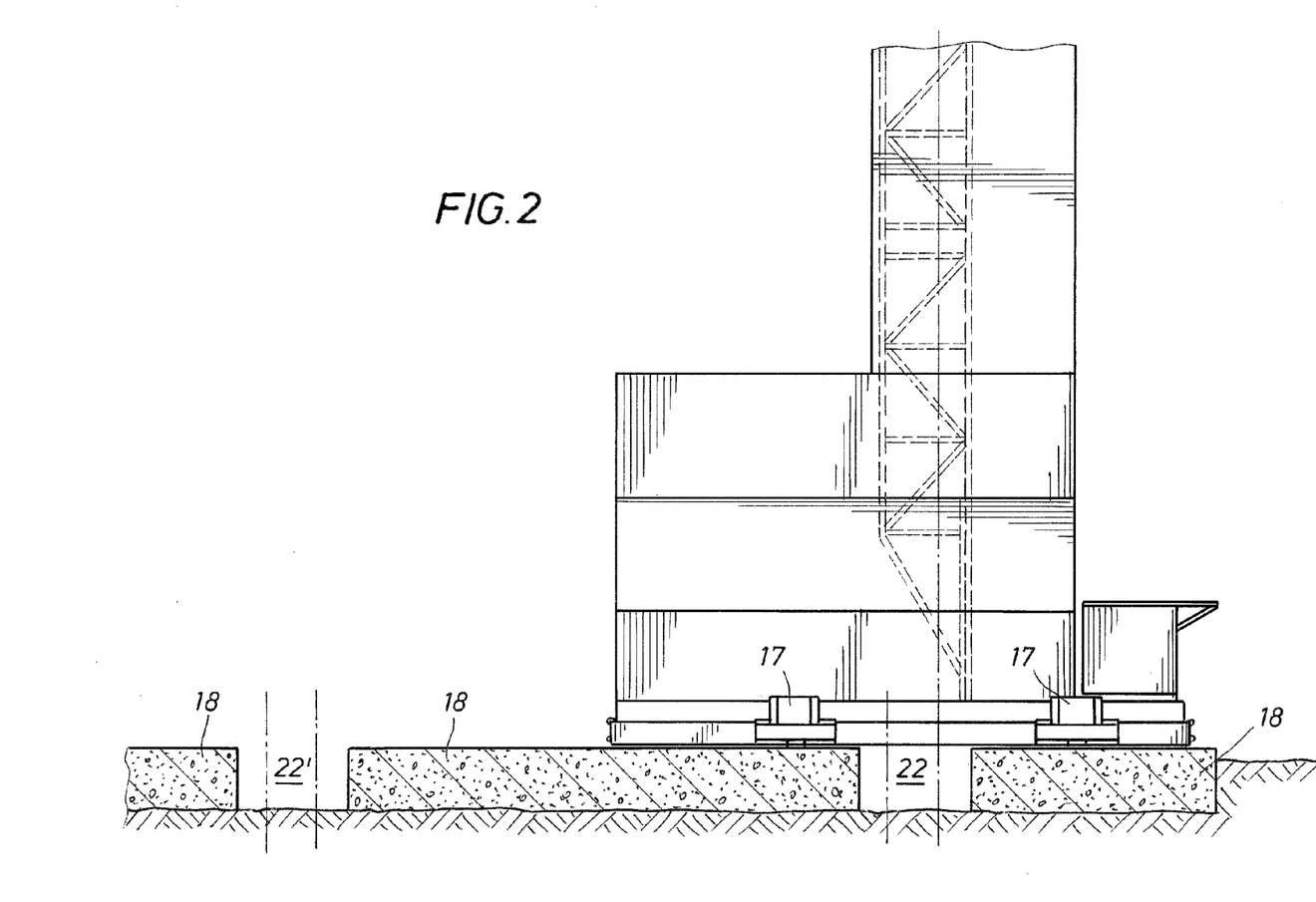
FIG. 2 is an elevation front view of the rig of FIG. 1 with parallel runs of concrete tracks for moving a rig with the air bearing subsystem disclosed herein.

FIG. 2 shows the rig from the front. A pair of cellars 22 and 22' are also included below the tracks 18. The cellars are roughly 6-8 feet deep, and permit workmen access to equipment at the bottom of the rig. The tracks 18 are built thick enough to hold the weight of a fully loaded rig, and typically will extend several hundred yards long. For routine operation, the derrick will remain in a vertical orientation as illustrated in FIG. 1. Only when the rig is to be move from the field, away from the tracks 18, will the derrick be lowered to a horizontal position.

In addition to moving the rig down the tracks 18, the system is adapted to move a rig from the cellar 22 to the other cellar 22' and vice versa, such as that shown in FIG. 2. This will be described in greater detail in respect of FIGS. 4-6.

Figure 3:
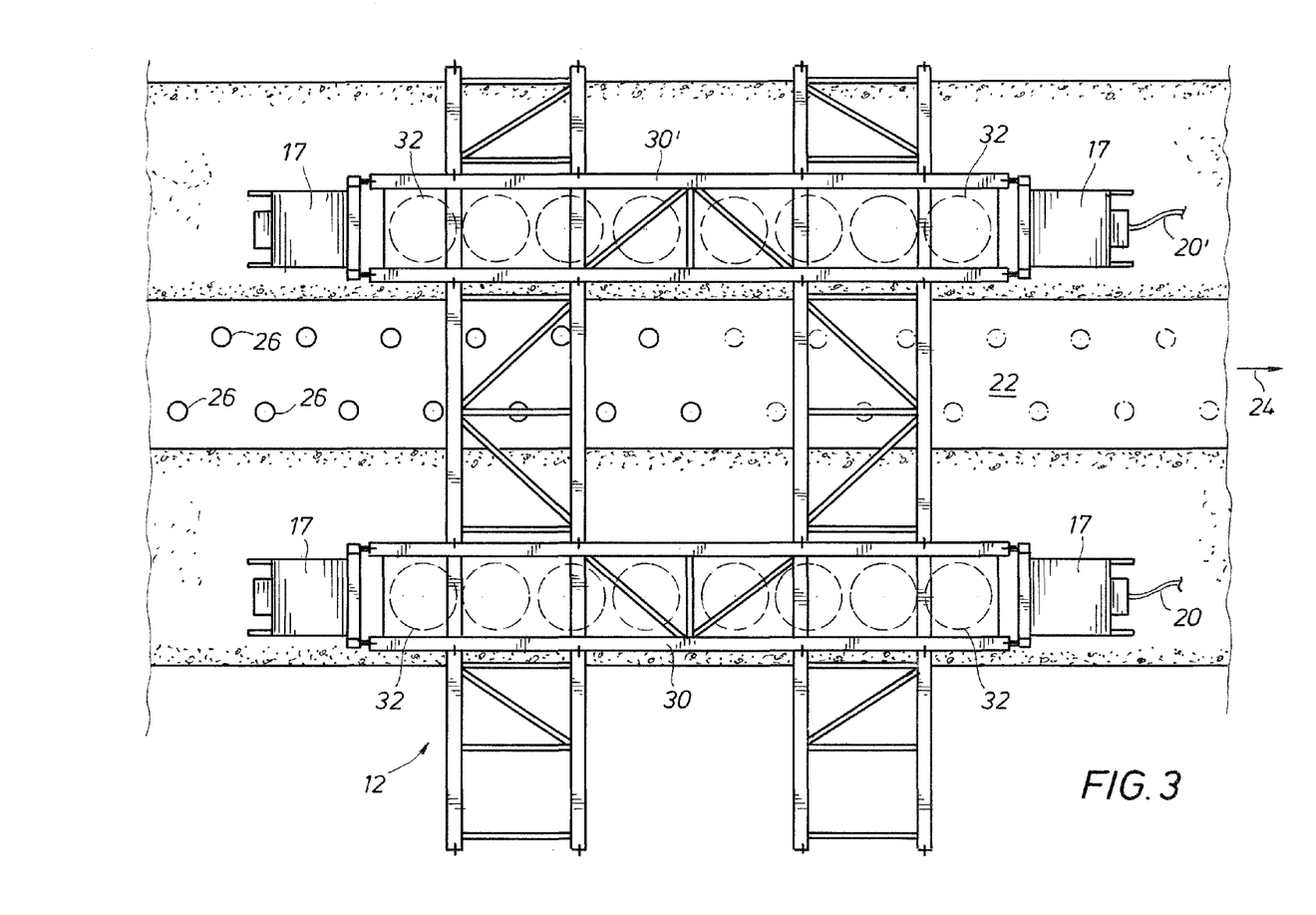
FIG. 3 is a plan view of parallel runs of tracks for moving a rig with the air bearing system disclosed herein along a row of well sites.

FIG. 3 depicts a plan view of the rig moving system of the invention. A forward direction for the movement of the rig 10 is arbitrarily assigned by a directional arrow 24. The system is capable is moving the rig from any of a plurality of well sites 26 to any other of the plurality of well sites. The air bearing subsystem 12 includes a starboard support frame 30 and a port support frame 30'. The starboard and port support frames each releasably retain a plurality of air bearings 32. Airbearings (also referred to as air casters) support loads on a cushion of air, in a manner similar to that of a hovercraft. Air is pumped into the bearing under pressure and passes freely through holes in the bottom surface of the bearing, raising the bearing off the support member beneath the bearing, preferably the tracks 18. The air that is forced out between the bearing and the ground forms a thin lubricating air film. This reduces the force necessary to move the rig by up to 96%. Such air bearings are available from many suppliers, but preferably from Airgo Company.

As shown in FIG. 3, each air bearing is about 60 inches in diameter, so that each bearing covers an area of about 2830 square inches. Thus, if air is supplied at 10 psi, adequate to lift the air bearing, each bearing then supports almost 30,000 pounds; with 16 air bearings as shown, the air bearing subsystem can support 480,000 pounds, more than the typical drilling or workover rig.

Figure 4:
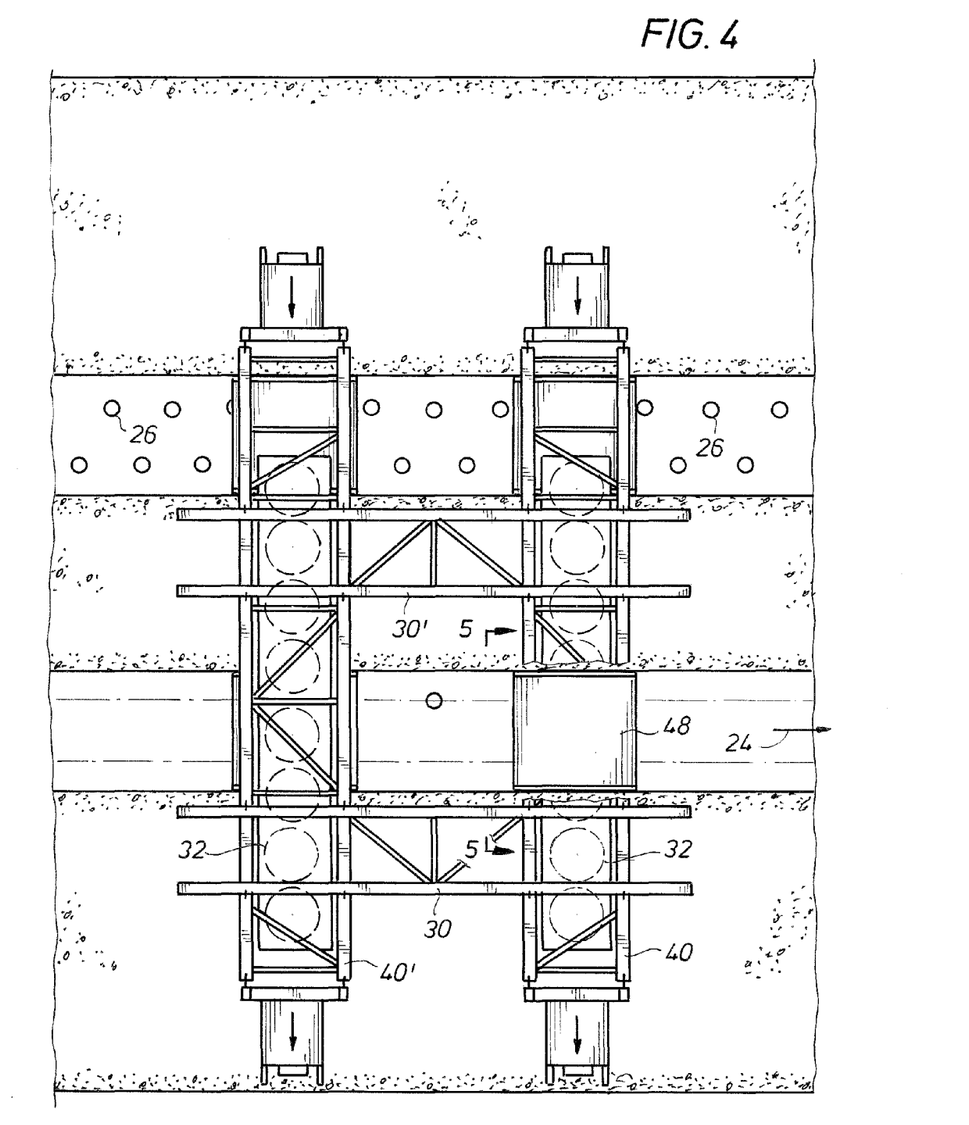
FIG. 4 is a plan view of a bridge structure with the air bearing subsystem re-oriented for moving the rig from one row of well sites to another row of well sites.

As previously described, the starboard and port support frames releasably receive the air bearings 32. With the orientation illustrated in FIG. 3, the rig may be positioned over any of the well sites 26 arranged within the cellar 22. If the rig is to be moved over to be positioned above the cellar 22', the rig remains in a vertical position, but the arrangement of FIG. 4 is temporarily installed. The arrangement of FIG. 4 includes a forward support frame 40 and an after support frame 40' ("forward" and "after" here are relative to the directional arrow 24). The plurality of air bearings are removed from the starboard and port support frames 30 and 30', and inserted in the forward and after support frames 40 and 40'. To support the rig and the air bearing subsystem during the move from one cellar to another, a bridge system 48 shown in FIGS. 5 and 6 is installed.

Figure 5:
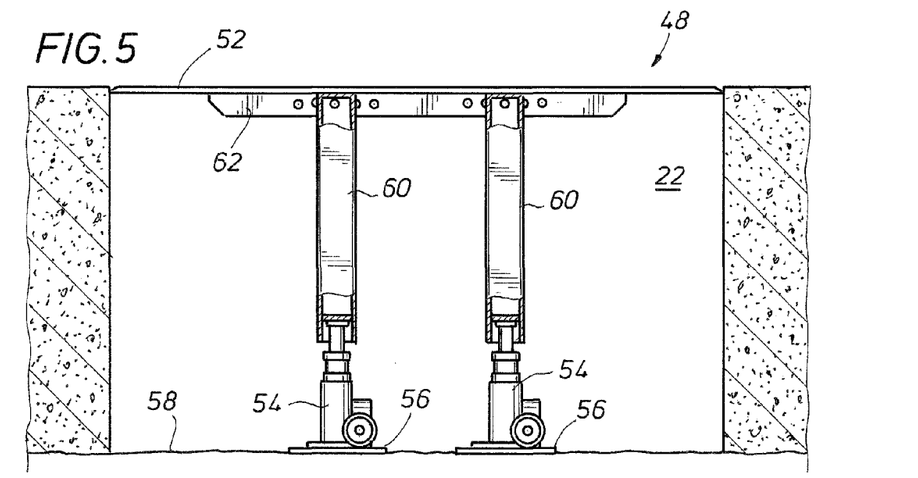
FIG. 5 is an elevation view of a bridge element for supporting a plurality of air bearings during the movement of a rig between rows of well sites.
Figure 6:
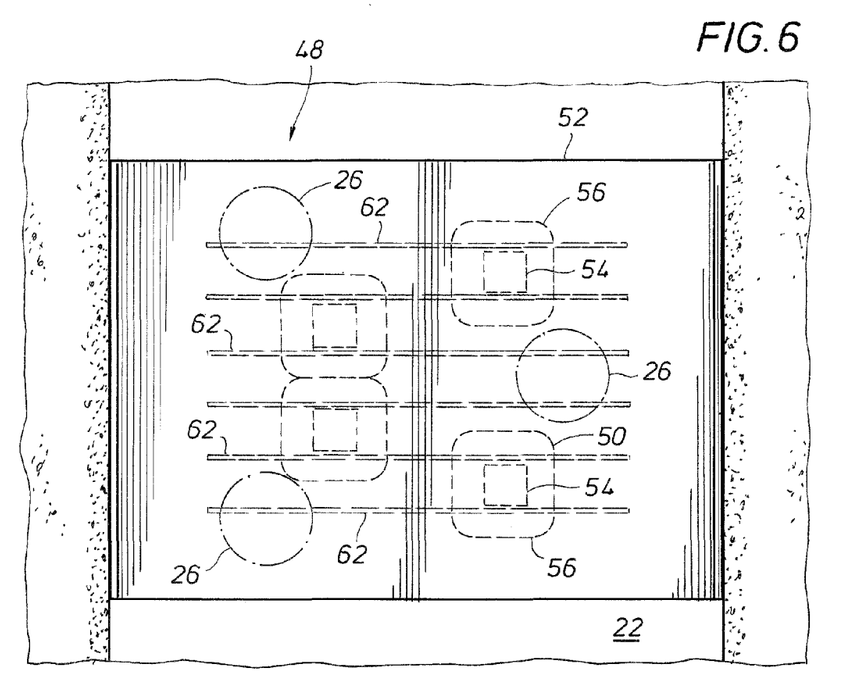
FIG. 6 is a top view of the bridge element of FIG. 5.

FIG. 5 is a side view of the bridge system 48 as seen along view lines 5-5 of FIG. 4, and FIG. 6 is a top view of the bridge system of FIG. 5. The bridge system 48 comprises primarily a removable support plate 52 supported by a plurality of retractable jacks 54. Each of the jacks rides on a pedestal 56 on a bottom 58 of the cellar, such as the cellar 22. The jacks 54 provide lifting force for lifting beams 60, which couple to the support plate 52 at support ribs 62, which provide mechanical rigidity to the plate and to support the weight of the rig as it is transported over the bridge system.

Figure 7:
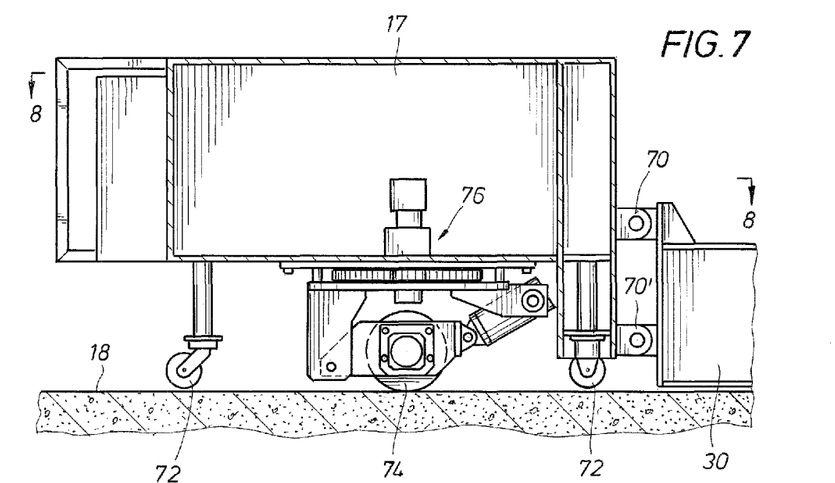
FIG. 7 is a side view of a hydraulic drive means for propelling the rig from one well site to another or between rows of well sites.
Figure 8:
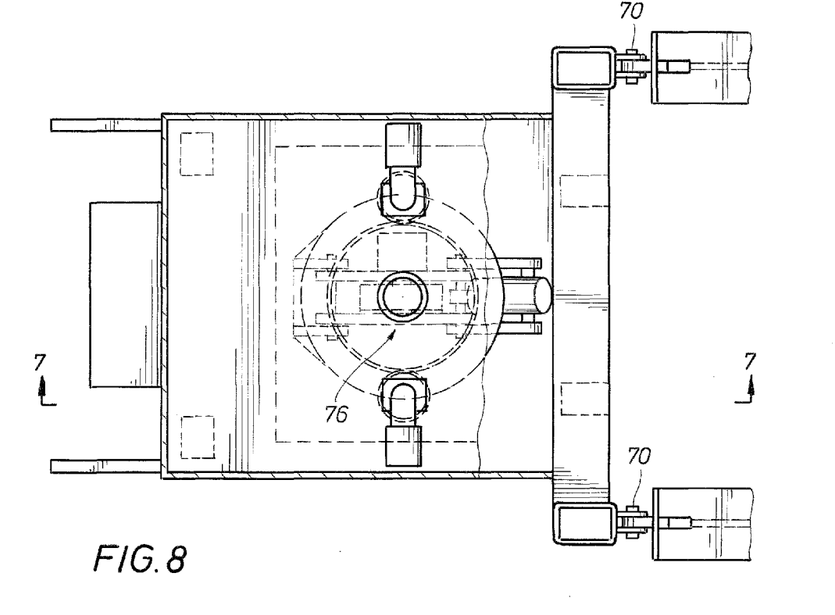
FIG. 8 is a top view of the hydraulic drive means of FIG. 7.

FIGS. 7 and 8 illustrate a presently preferred embodiment of a drive system 17 (See FIG. 1) of the present invention.

FIG. 7 is a side view of a drive system 17 in partial section as seen along section lines 7-7 of FIG. 8 and FIG. 8 is a top view of the system of FIG. 7. Note that the system may include a drive system 17 at the front end and the rear end of the rig 14, and may also include a drive system at the starboard side and the port side, each on its own concrete track, if desired. The drive system 17 is flexibly coupled to a support frame 30 or 30', as the case may be, at an upper joint 70, and a lower joint 70' may also be included. The drive system 17 is supported by a plurality of un-driven wheels 72. The drive system includes hydraulic mechanism (not shown) to provide rotational drive force to a drive wheel 74. The drive wheel is powered from the drive system 17 and is in frictional contact with the concrete track 18 to move the rig. The drive wheel 74 is also coupled to a steering mechanism 76 to steer the system to the right or the left, to direct the system so that the rig is properly aligned with a well 26.

Figure 9:
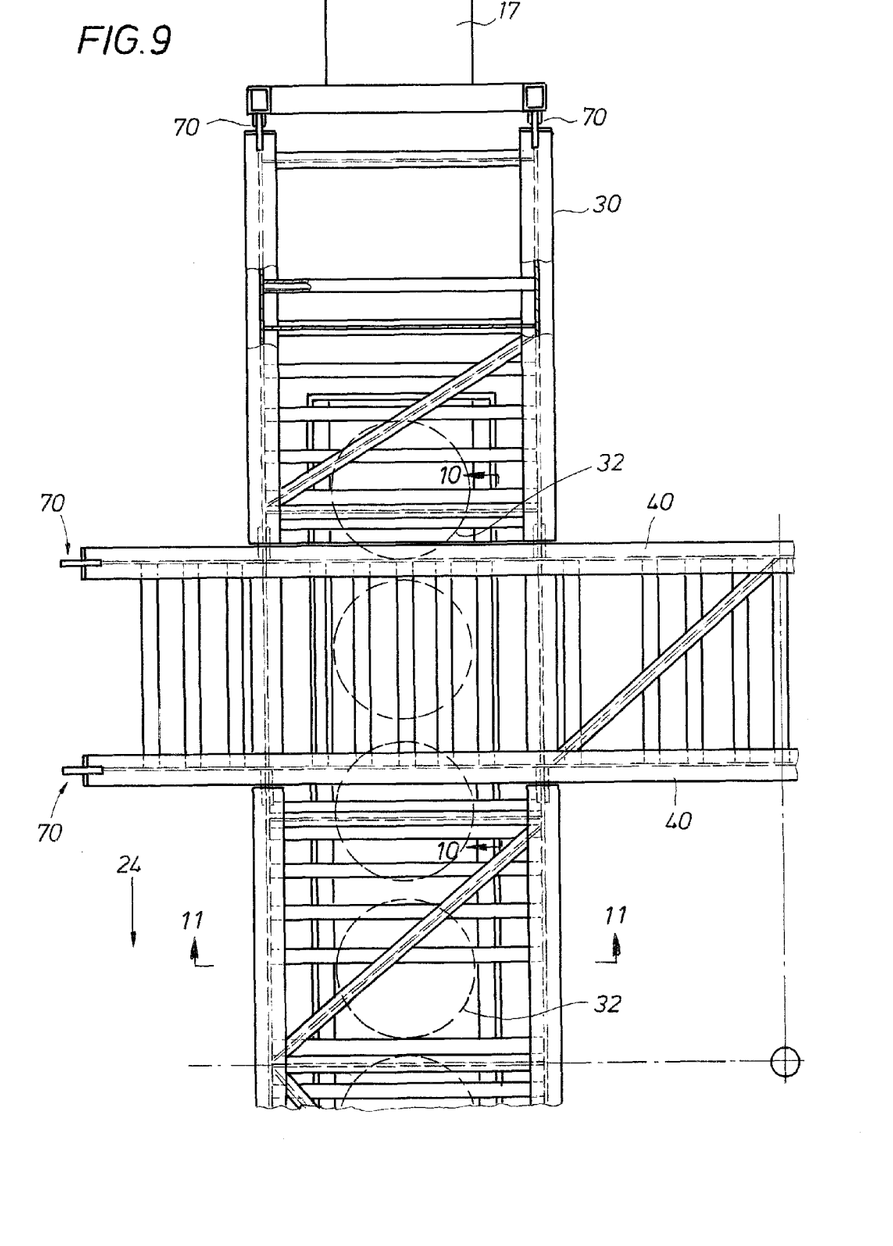
FIG. 9 is a detail view of the modular racks for retaining the air bearing subsystem.
Figure 10:
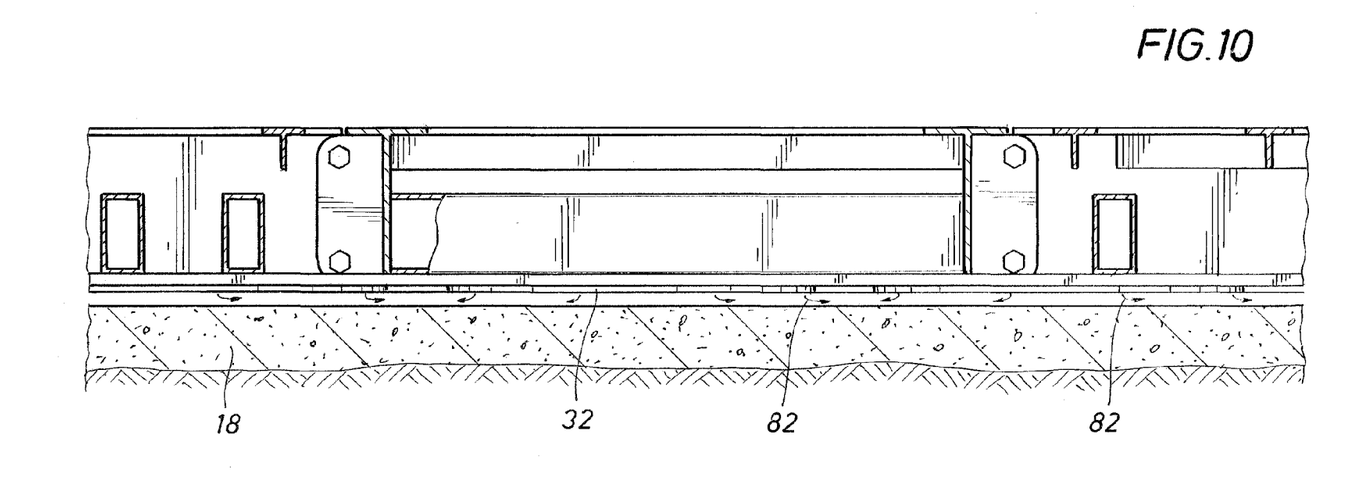
FIG. 10 is section view of the modular racks as seen along site lines 10-10 in FIG. 9.
Figure 11:
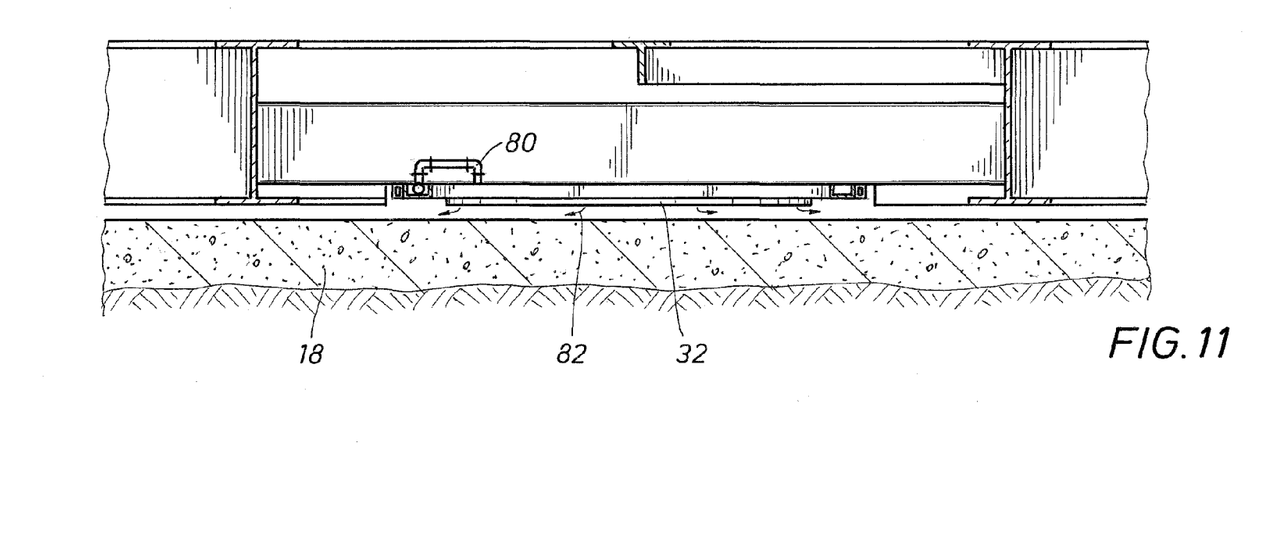
FIG. 11 is section view of the modular racks as seen along site lines 11-11 in FIG. 9.

Finally, FIGS. 9, 10, and 11 illustrate the flexible nature of the air bearings 32 as applied to a system for moving a rig in accordance with the present invention. FIG. 9 is a plan view of the framework comprising support frames 30, 30', 40, and 40'. FIG. 10 is a side view of the framework as seen along section lines 10-10 of FIG. 9 and similarly FIG. 11 is a side view as seen along section lines 11-11. Each of the air bearings 32 is individually deployable within the framework, and each is supplied with compressed air through an air supply system, designated generally with element number 80. Air is forced into the air bearings, from which it escapes along the bottom surfaces of the air bearings, thereby creating a cushion of air beneath the air bearing system, and consequently the rig, as shown by a plurality of arrows 82.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A system for the movement of a drilling/workover rig from one well site to another, comprising:
    an air bearing subsystem beneath the rig and capable of providing sufficient lift to develop a cushion of air beneath the rig;
    a first track supporting the air bearing subsystem;
    a second track parallel to the first track;
    a first cellar below the first track;
    a second cellar below the second track;
    a cellar bridge over at least one of the first and second cellars; and
    a motive system creating parallel force on the rig to move the rig, supported by the air bearing subsystem, along the first track.

2. The system of claim 1, wherein the air bearing subsystem includes:
    port and starboard support frames parallel to the first track; and
    a plurality of air bearings removably supported within the port and starboard support frames.

3. The system of claim 1, wherein the air bearing subsystem includes:
    port and starboard support frames parallel to the first track;
    forward and after support frames perpendicular to the first track;
    a plurality of air bearings alternately and removably supported within the port and starboard support frames and the forward and after support frames.

* * * * *